United States Patent
Otaka et al.

(10) Patent No.: US 12,231,348 B2
(45) Date of Patent: Feb. 18, 2025

(54) COMMUNICATION CONTROL APPARATUS, COMMUNICATION SYSTEM, COMMUNICATION CONTROL METHOD, AND STORAGE MEDIUM FOR DETERMINING WHETHER TO PERMIT DATA TRANSMISSION

(71) Applicant: HONDA MOTOR CO., LTD., Tokyo (JP)

(72) Inventors: Masaru Otaka, Tokyo (JP); Ryusuke Tamanaha, Tokyo (JP); Shohei Tsukahara, Tokyo (JP); Ryo Saiki, Tokyo (JP); Naoko Imai, Tokyo (JP); Takahiro Iijima, Tokyo (JP); Yusuke Oi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 602 days.

(21) Appl. No.: 17/467,584

(22) Filed: Sep. 7, 2021

(65) Prior Publication Data
US 2022/0086101 A1 Mar. 17, 2022

(30) Foreign Application Priority Data
Sep. 17, 2020 (JP) .................................. 2020-156595

(51) Int. Cl.
*H04L 47/722* (2022.01)
*H04L 1/1829* (2023.01)
(Continued)

(52) U.S. Cl.
CPC .......... *H04L 47/722* (2013.01); *H04L 1/1835* (2013.01); *H04L 41/0896* (2013.01);
(Continued)

(58) Field of Classification Search
None
See application file for complete search history.

(56) References Cited

U.S. PATENT DOCUMENTS

2006/0092837 A1* 5/2006 Kwan ................... H04L 47/266
370/468
2013/0084811 A1* 4/2013 Yoon ................... H04W 80/045
455/73
(Continued)

FOREIGN PATENT DOCUMENTS

JP 2000286891 A 10/2000
JP 2003046540 A 2/2003
(Continued)

OTHER PUBLICATIONS

Japanese Office Action for Japanese Patent Application No. 2020156595 mailed Sep. 8, 2023.

*Primary Examiner* — Jay L Vogel
(74) *Attorney, Agent, or Firm* — Thomas | Horstemeyer, LLP

(57) ABSTRACT

There is provided a communication control apparatus comprising a processor. The processor receives, from a first mobile communication apparatus, a request for permission of data transmission to a second mobile communication apparatus, the second mobile communication apparatus including a buffer memory to store received data. The processor determines whether to permit the data transmission based on a free capacity of the buffer memory and a reserved capacity indicated by a reservation setting of the buffer memory. The processor updates, when the data transmission is determined to be permitted, the reservation setting such that a capacity for received data corresponding to the data transmission is added to the reserved capacity. The processor transmits, when the data transmission is determined to be permitted, a response indicating that the data transmission is permitted to the first mobile communication apparatus.

15 Claims, 5 Drawing Sheets

(51) Int. Cl.
 *H04L 41/0896* (2022.01)
 *H04L 49/9047* (2022.01)
 *H04W 4/46* (2018.01)
 *H04W 28/14* (2009.01)
 *H04W 28/26* (2009.01)
 *H04W 84/18* (2009.01)
 *H04L 41/147* (2022.01)

(52) U.S. Cl.
 CPC ............ *H04L 49/9047* (2013.01); *H04W 4/46* (2018.02); *H04W 28/14* (2013.01); *H04W 28/26* (2013.01); *H04W 84/18* (2013.01); *H04L 41/147* (2013.01)

(56) References Cited

U.S. PATENT DOCUMENTS

| | | | |
|---|---|---|---|
| 2014/0064078 A1 | 3/2014 | Osonoi | |
| 2015/0281094 A1* | 10/2015 | Kase | H04L 47/266 |
| | | | 370/230 |
| 2019/0124395 A1* | 4/2019 | Lin | H04N 21/4331 |
| 2021/0376962 A1* | 12/2021 | Thomas | H04L 1/1812 |
| 2022/0030461 A1* | 1/2022 | Kanamarlapudi | H04L 1/1835 |

FOREIGN PATENT DOCUMENTS

| | | | | |
|---|---|---|---|---|
| JP | 5391582 B2 | 1/2014 | | |
| JP | 2014045417 A | 3/2014 | | |
| JP | 2015188163 A | 10/2015 | | |
| WO | WO-2012124431 A1 * | 9/2012 | ............ | G06F 13/122 |

\* cited by examiner

COMMUNICATION CONTROL APPARATUS, COMMUNICATION SYSTEM, COMMUNICATION CONTROL METHOD, AND STORAGE MEDIUM FOR DETERMINING WHETHER TO PERMIT DATA TRANSMISSION

CROSS-REFERENCE TO RELATED APPLICATION(S)

This application claims priority to and the benefit of Japanese Patent Application No. 2020-156595 filed on Sep. 17, 2020, the entire disclosure of which is incorporated herein by reference.

BACKGROUND OF THE INVENTION

Field of the Invention

The present invention relates to a communication control apparatus, a communication system, a communication control method, and a storage medium.

Description of the Related Art

In an ad-hoc network, there is known a technique for alleviating congestion in relay node by selecting a relay node from among a plurality of adjacent nodes based on a selection function including the number of in-use buffers (Japanese Patent No. 5391582).

Here, a case where two mobile communication apparatuses (a first mobile communication apparatus and a third mobile communication apparatus) desire to select an identical mobile communication apparatus (a second mobile communication apparatus) as a data transmission destination will be considered. In this case, when both the first mobile communication apparatus and the third mobile communication apparatus actually select the second mobile communication apparatus as a data transmission destination and transmit data, a capacity of a buffer memory of the second mobile communication apparatus may be insufficient.

Even if the first mobile communication apparatus and the third mobile communication apparatus determine whether to select the second mobile communication apparatus as a transmission destination in consideration of a free capacity of the buffer memory, a possibility that the capacity of the buffer memory becomes insufficient cannot be effectively reduced. This is because the free capacity of the buffer memory does not change until the second mobile communication apparatus actually receives data; the free capacity of buffer memory does not change only when the second mobile communication apparatus is simply selected as a transmission destination. Since such a situation is not considered in Japanese Patent No. 5391582, the technique of Japanese Patent No. 5391582 cannot effectively reduce the possibility that the capacity of the buffer memory of the second mobile communication apparatus becomes insufficient.

SUMMARY OF THE INVENTION

The present invention has been made in view of such a situation. The present invention provides a technique for reducing a possibility that a capacity of a buffer memory of a mobile communication apparatus that receives data becomes insufficient in an environment in which a plurality of mobile communication apparatuses may desire to select an identical mobile communication apparatus as a data transmission destination.

According to an aspect of the present invention, there is provided a communication control apparatus comprising a processor configured to: receive, from a first mobile communication apparatus, a request for permission of data transmission to a second mobile communication apparatus, the second mobile communication apparatus including a buffer memory to store received data; determine whether to permit the data transmission based on a free capacity of the buffer memory and a reserved capacity indicated by a reservation setting of the buffer memory; update, when the data transmission is determined to be permitted, the reservation setting such that a capacity for received data corresponding to the data transmission is added to the reserved capacity; and transmit, when the data transmission is determined to be permitted, a response indicating that the data transmission is permitted to the first mobile communication apparatus.

DESCRIPTION OF THE EMBODIMENTS

Figure 1:
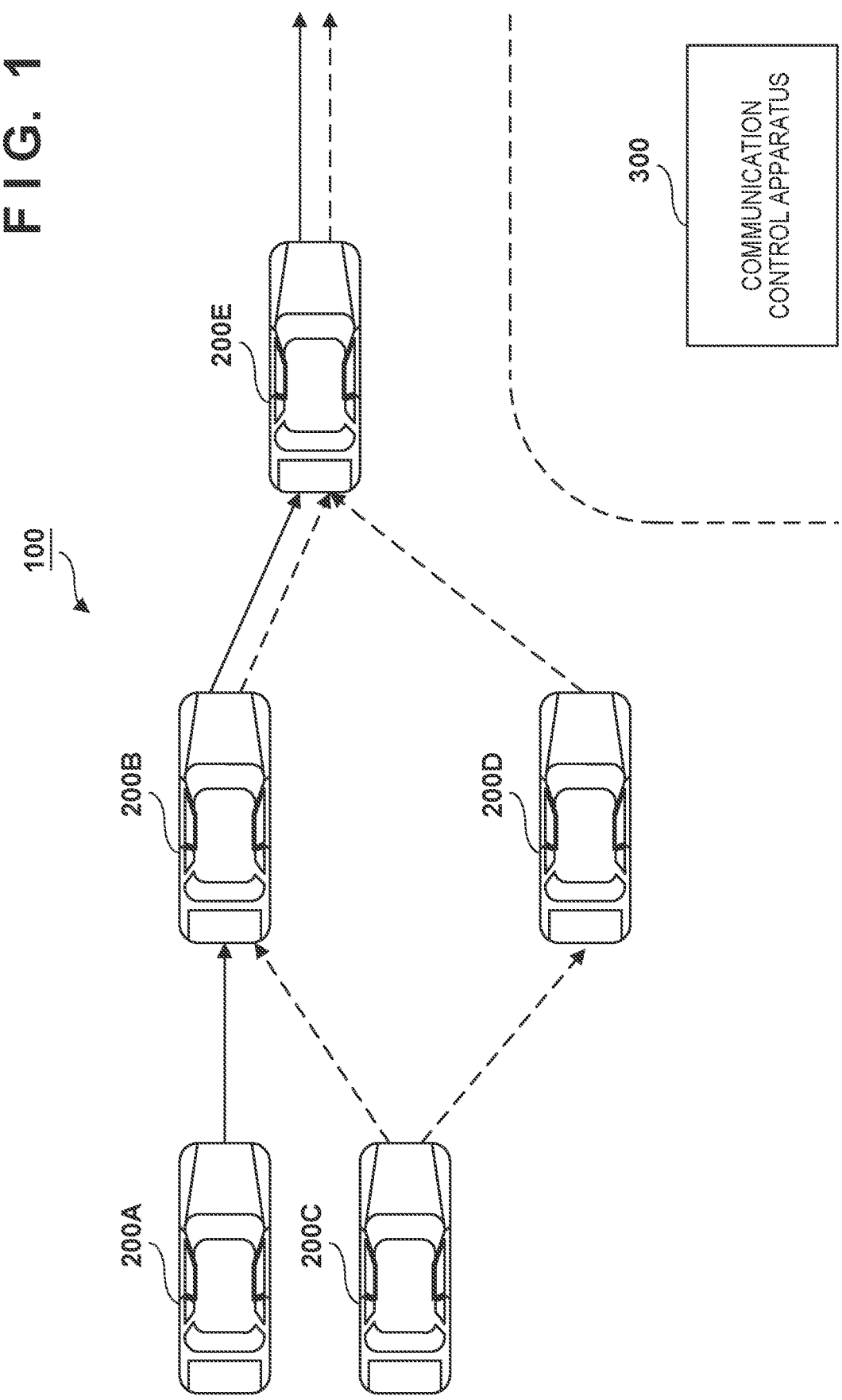
FIG. 1 is a conceptual view of a network 100 including a plurality of mobile communication apparatuses.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a conceptual view of a network 100 including a plurality of mobile communication apparatuses. Here, a case where each of the mobile communication apparatuses is a vehicle will be described as an example, but the mobile communication apparatus of the present embodiment is not limited to a vehicle, and may be, for example, an on-board device detachable to/from a vehicle, or may be a smartphone. Although five vehicles (vehicles 200A, 200B, 200C, 200D, and 200E) are illustrated in FIG. 1, the number of vehicles is not particularly limited. In the following description, when there is no need to distinguish the vehicles, the vehicles included in the network 100 are referred to as a vehicle 200. A specific configuration of the vehicle 200 will be described later.

In the description of the present embodiment, the network 100 is configured as, for example, a mesh network. However, a specific configuration of the network 100 is not particularly limited, and another type of network configuration that performs routing by multi-hop communication may be adopted. In the present embodiment, it is not essential that a plurality of mobile communication apparatuses (a plurality of vehicles 200) constitutes a network. The configuration and operation described below may be applied to an environment in which a plurality of mobile communication apparatuses (a plurality of vehicles 200) communicate with each other without forming a network, as long as it is technically possible.

A communication control apparatus 300 controls communication performed among the vehicles 200. Details of the control will be described later. In FIG. 1, the communication control apparatus 300 is illustrated as a block independent of the vehicles 200, but a hardware configuration for implementing the communication control apparatus 300 is not particularly limited. As an example, the communication control apparatus 300 is configured as a server connected to the Internet, and communicates with the vehicles 200 via the Internet. As another example, each of the vehicles 200 may include the communication control apparatus 300.

In FIG. 1, a solid arrow indicates a flow of data having a vehicle 200A as an originating source, and a broken arrow indicates a flow of data having a vehicle 200C as an originating source. A routing destination of a vehicle 200E may be another vehicle (not illustrated) included in the network 100, may be a Wi-Fi access point, or may be another type of network node.

Figure 2:
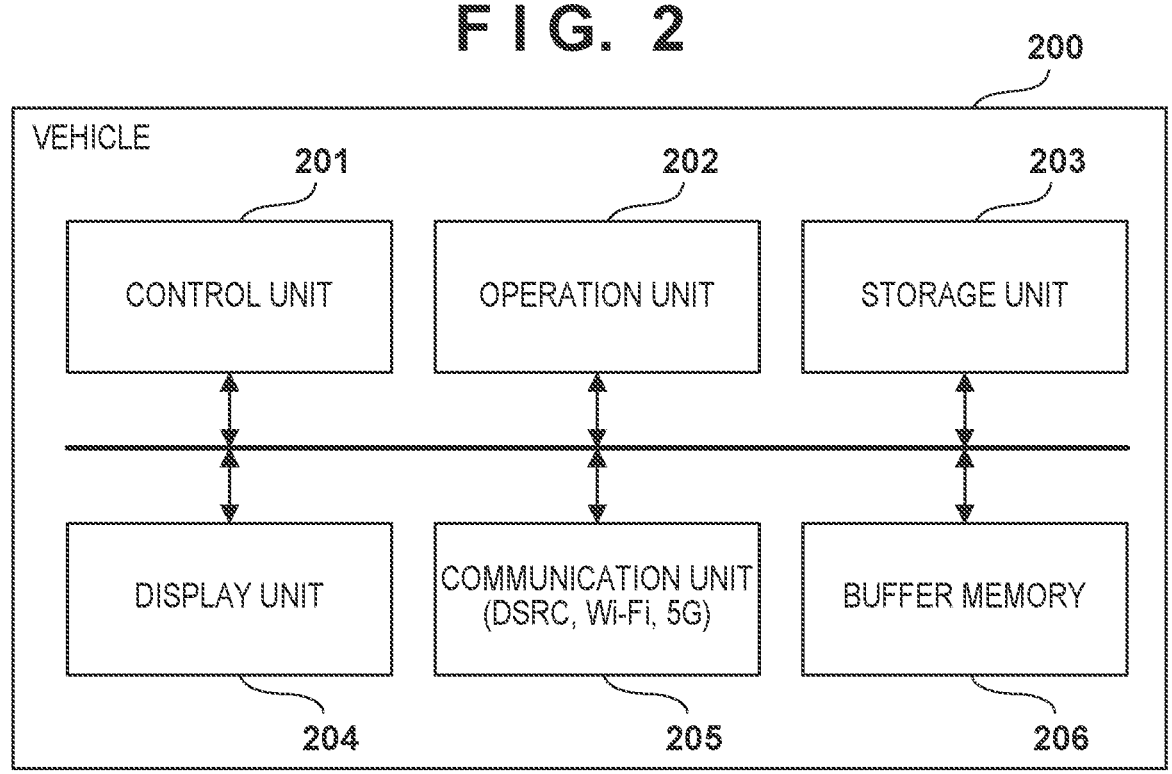
FIG. 2 is a functional block diagram of a vehicle 200.

FIG. 2 is a functional block diagram of the vehicle 200. Here, functional blocks mainly related to a function as a mobile communication apparatus are illustrated, and functional blocks (such as an engine) related to a function as a vehicle are not illustrated.

A control unit 201 includes, for example, a CPU, ROM, RAM, and the like, and controls the entire vehicle 200 by executing various programs. An operation unit 202 includes, for example, an input device such as a button and a touch panel, and receives an input operation by a user. A storage unit 203 includes a recording medium such as an HDD and an SDD, and stores various programs. A display unit 204 includes, for example, a liquid crystal display, and displays a user interface, various types of information, and the like.

A communication unit 205 is a communication unit having a communication function for the vehicle 200 to communicate with an external apparatus (another vehicle 200, the communication control apparatus 300, and the like). The communication unit 205 may correspond to a plurality of communication methods such as Dedicated Short Range Communications (DSRC), cellular V2X (C-V2X), Wi-Fi, 4G, and 5G. In this case, the communication unit 205 may use DSRC or C-V2X to communicate with another vehicle 200, and may use 5G to communicate with the communication control apparatus 300.

A buffer memory 206 is a memory for storing data received via the communication unit 205. When the vehicle 200 that has received data plays a role as a repeater in the network 100, the vehicle 200 that has received data transfers the data stored in the buffer memory 206 to another vehicle 200 that is a relay destination. When the vehicle 200 that has received the data is a destination (final receiver) of the data, the vehicle 200 sequentially moves the data stored in the buffer memory 206 to the storage unit 203.

Note that, in FIG. 2, the storage unit 203 and the buffer memory 206 are illustrated as separate blocks, but these may be configured as integrated hardware. For example, a part of a storage area of the storage unit 203 may be used as the buffer memory 206.

Figure 3:
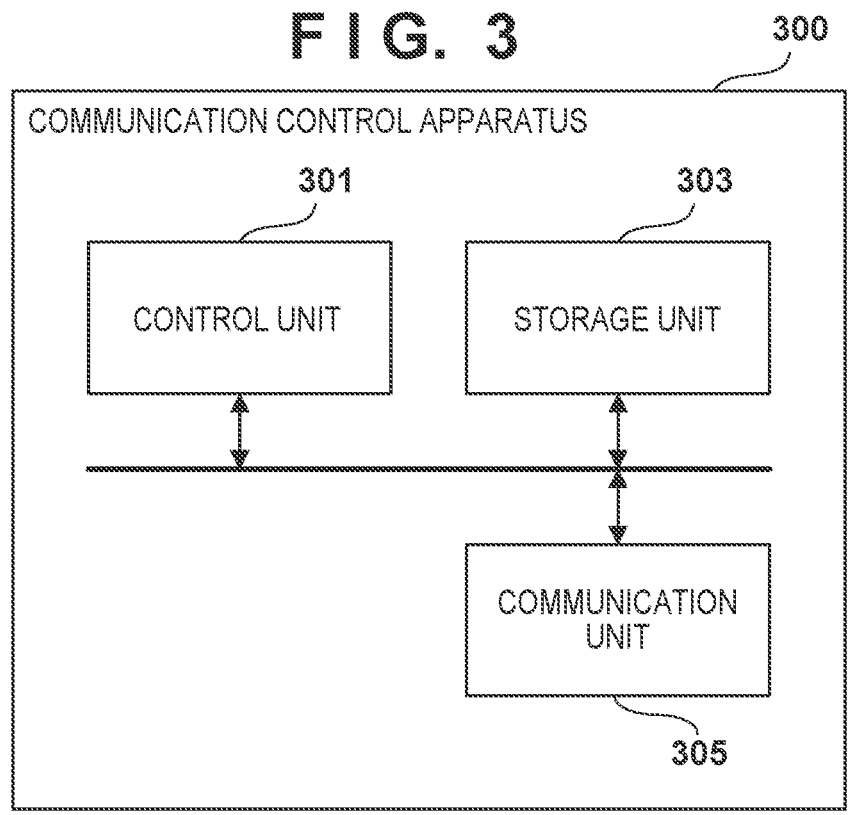
FIG. 3 is a functional block diagram of a communication control apparatus 300.

FIG. 3 is a functional block diagram of the communication control apparatus 300. A control unit 301 includes, for example, a CPU, ROM, RAM, and the like, and controls the entire communication control apparatus 300 by executing various programs.

A storage unit 303 includes a recording medium such as an HDD and an SDD, and stores various programs. In addition, the storage unit 303 stores a reservation setting of the buffer memory 206 of the vehicle 200. The reservation setting is a setting for managing reservation of a capacity of the buffer memory 206. The control unit 301 can increase or decrease a reserved capacity of the buffer memory 206 by updating the reservation setting as necessary.

A communication unit 305 is a communication unit for the communication control apparatus 300 to communicate with the vehicle 200. As described above, the communication control apparatus 300 may be configured as a server connected to the Internet. In this case, the communication control apparatus 300 is connected to the Internet using the communication unit 305 and communicates with the vehicle 200 via the Internet. Alternatively, as described above, each of the vehicles 200 may include the communication control apparatus 300. In this case, the functional blocks illustrated in FIG. 2 may also serve as the functional blocks illustrated in FIG. 3 (For example, the control unit 201 may also serve as the control unit 301).

Figure 4:
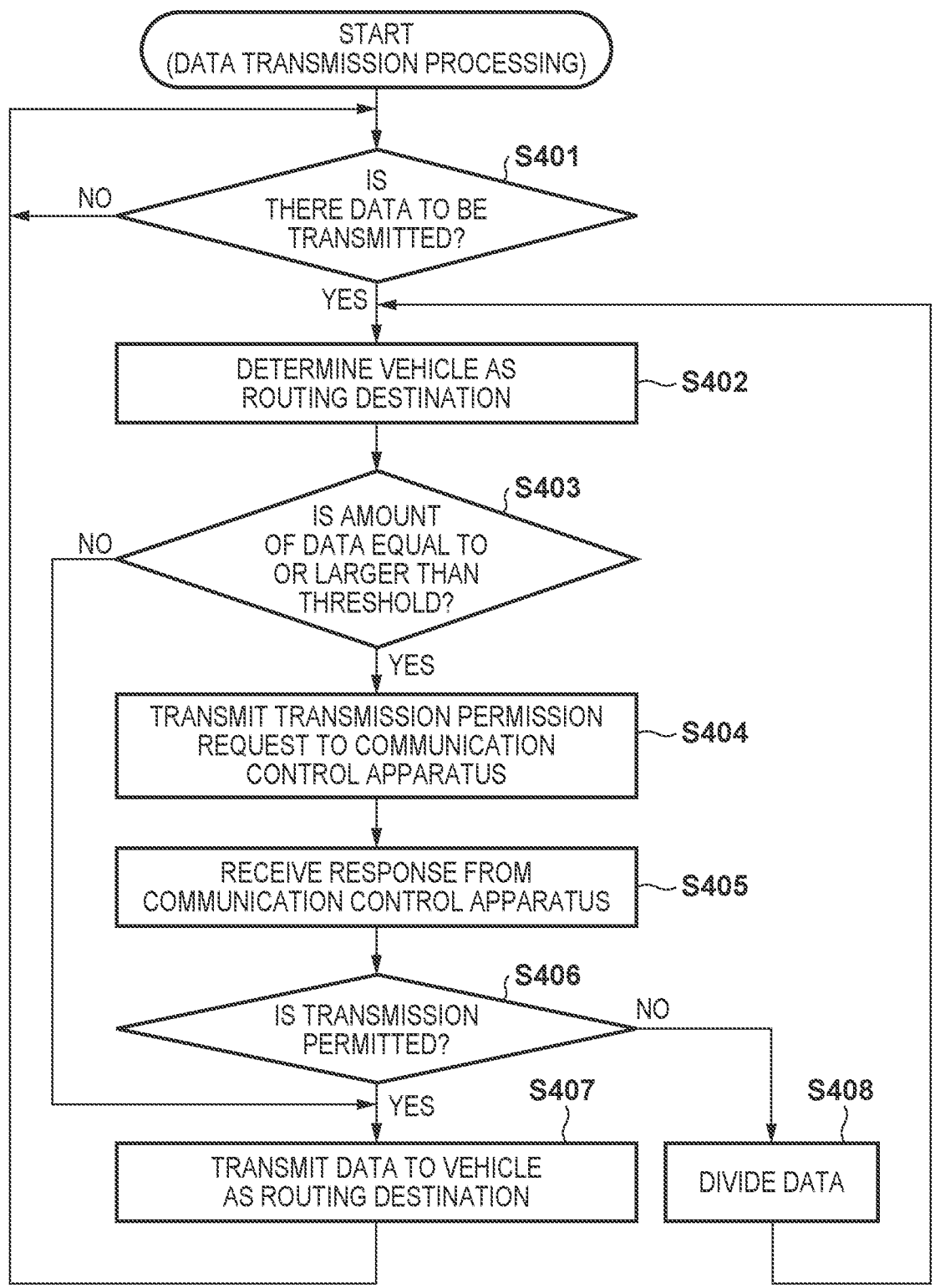
FIG. 4 is a flowchart of data transmission processing executed by the vehicle 200.
Figure 5:
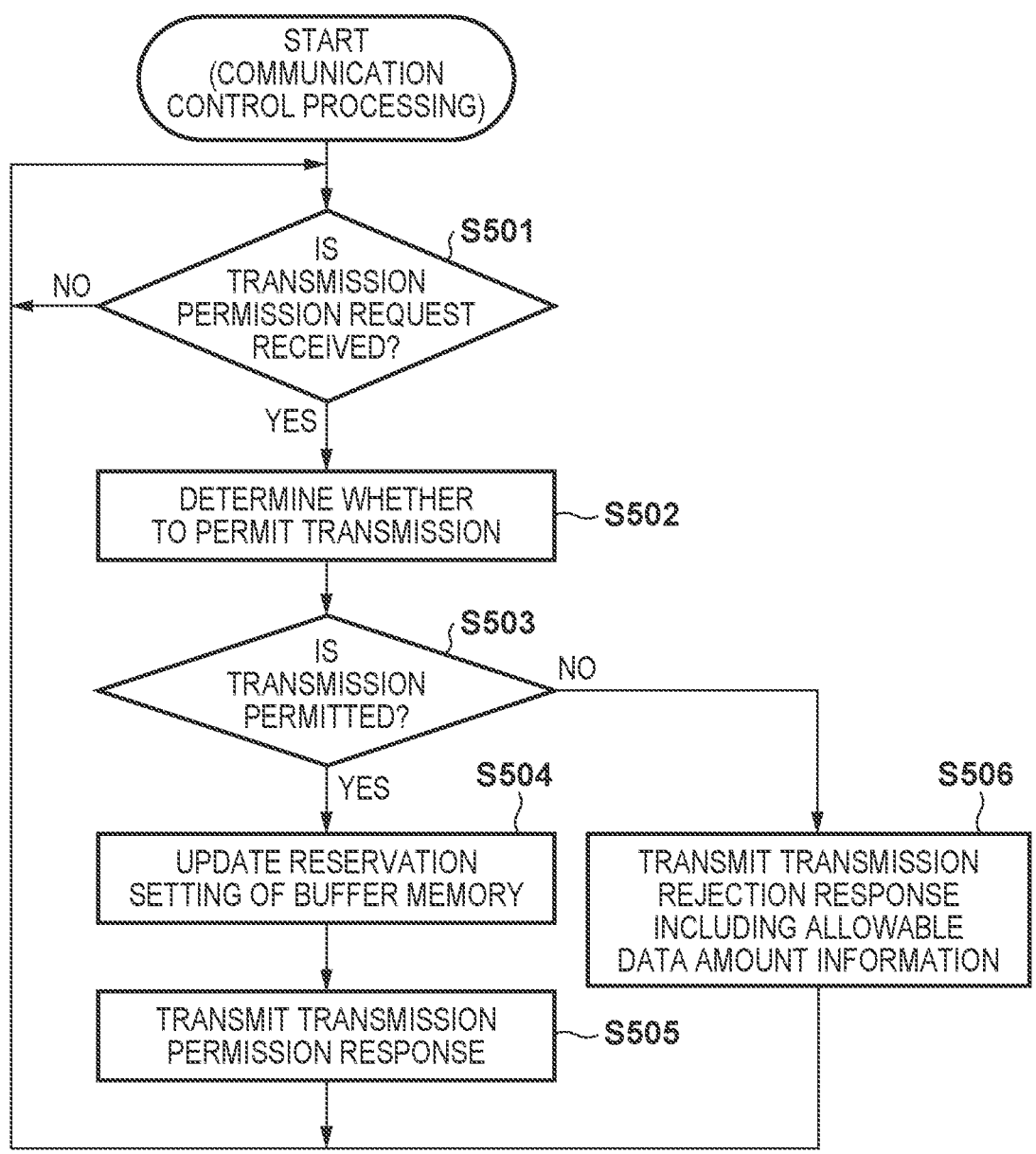
FIG. 5 is a flowchart of communication control processing executed by the communication control apparatus 300.

Next, data transmission processing executed by the vehicle 200 and communication control processing executed by the communication control apparatus 300 will be described with reference to FIGS. 4 and 5. FIG. 4 is a flowchart of data transmission processing executed by the vehicle 200. FIG. 5 is a flowchart of the communication control processing executed by the communication control apparatus 300.

Referring first to FIG. 4, in step S401, the control unit 201 determines whether there is data to be transmitted to another vehicle 200. For example, when a user of the vehicle 200 instructs transmission of data using the operation unit 202, when the vehicle 200 receives data to be relayed as a repeater in the network 100, or the like, it is determined that there is data to be transmitted to another vehicle 200. The control unit 201 repeats the determination in step S401 until it is determined that there is data to be transmitted to another vehicle 200. When it is determined that there is data to be transmitted to another vehicle 200, a processing step proceeds to step S402.

In step S402, the control unit 201 determines a routing destination of data. A method for determining a routing destination is not particularly limited. For example, when the network 100 is a mesh network, the control unit 201 can determine a routing destination of data by using any existing routing technique in the mesh network. For example, consider a case where the vehicle 200A is a transmitter of data and the vehicle 200E is a destination (final receiver) of the data in FIG. 1. In this case, since the vehicle 200B located between the vehicle 200A and the vehicle 200E can serve as a repeater, the control unit 201 can determine the vehicle 200B as a routing destination of data.

Hereinafter, a case where a transmitter of data is the vehicle 200A and a routing destination of data is the vehicle 200B will be described as an example.

In step S403, the control unit 201 determines whether an amount of data to be transmitted is equal to or larger than a threshold (equal to or larger than a second threshold). When the data amount is equal to or larger than the threshold (equal to or larger than the second threshold), the processing step proceeds to step S404, and when the data amount is less than the threshold (less than the second threshold), the processing step proceeds to step S407.

In step S404, the control unit 201 of the vehicle 200A (first mobile communication apparatus) transmits a request (transmission permission request) for permission of data transmission to the vehicle 200B (second mobile communication apparatus) to the communication control apparatus 300. The transmission permission request may include information indicating data amount of data to be transmitted.

Here, prior to descriptions after step S405, the communication control processing executed by the communication control apparatus 300 will be described with reference to FIG. 5. In step S501, the control unit 301 of the communication control apparatus 300 determines whether a transmission permission request has been received. The control unit 301 repeats the determination of step S501 until it is determined that the transmission permission request has been received. When it is determined that the transmission permission request has been received, the processing step proceeds to step S502. Here, it is assumed that the control unit 301 receives the transmission permission request for the vehicle 200B described in step S404 from the vehicle 200A.

In step S502, the control unit 301 determines whether to permit data transmission based on the free capacity of the buffer memory 206 of the vehicle 200B and the reserved capacity indicated by the reservation setting of the buffer memory 206. This determination is performed in order to reduce a possibility that data reception fails due to insufficient capacity of the buffer memory 206 of the vehicle 200B. Therefore, when there is a high possibility of insufficient capacity of the buffer memory 206, the control unit 301 determines not to permit data transmission.

A specific determination method in step S502 is not particularly limited, and any determination method can be used as long as the possibility that data reception fails due to the insufficient capacity of the buffer memory 206 can be reduced as much as possible. For example, the control unit 301 determines to permit data transmission when a capacity obtained by subtracting the reserved capacity from the free capacity is equal to or larger than a threshold, and otherwise determines not to permit data transmission.

Alternatively, the control unit 301 may determine whether to permit data transmission based on data amount of the requested data transmission in addition to the free capacity and the reserved capacity.

Also in this case, a specific determination method is not particularly limited, and any determination method can be used as long as the possibility that the data reception fails due to the insufficient capacity of the buffer memory 206 can be reduced as much as possible. For example, the control unit 301 determines an upper limit (allowable data amount) of the amount of data that can be transmitted by the vehicle 200A based on the free capacity and the reserved capacity. Then, the control unit 301 determines to permit data transmission when the data amount of the requested data transmission does not exceed the allowable data amount, and otherwise determines not to permit data transmission.

The allowable data amount may be data amount corresponding to a capacity obtained by subtracting the reserved capacity from the free capacity, or may be data amount corresponding to a capacity obtained by subtracting the reserved capacity and a predetermined margin capacity from the free capacity. By considering the predetermined margin capacity as in the latter case, it is possible to reduce a possibility that the buffer memory 206 is completely full. This can reduce a possibility that the vehicle 200B cannot receive other important data.

When the data amount of the requested data transmission is less than a threshold (less than a first threshold), it is considered that the possibility that data reception fails due to the insufficient capacity of the buffer memory 206 is relatively low regardless of the free capacity and the reserved capacity of the buffer memory 206. Therefore, when the data amount of the requested data transmission is less than the threshold (less than the first threshold), the control unit 301 may determine to permit data transmission regardless of the free capacity and the reserved capacity of the buffer memory 206.

In step S503, the control unit 301 determines whether to permit data transmission based on the determination result in step S502. When data transmission is permitted, the processing step proceeds to step S504, and otherwise the processing step proceeds to step S506.

In step S504, the control unit 301 updates the reservation setting of the buffer memory 206 of the vehicle 200B such that the capacity for the received data corresponding to the data transmission to be permitted is added to the reserved capacity. Therefore, when a subsequent transmission permission request with the vehicle 200B as a data transmission destination is received, the determination of step S502 for the subsequent transmission permission request is performed based on the reservation setting updated in step S504.

A size of a capacity to be added to the reserved capacity is not particularly limited. For example, the control unit 301 determines the size of the capacity to be added to the reserved capacity based on the data amount of the requested data transmission. For example, the control unit 301 may add a capacity corresponding to the data amount of the requested data transmission to the reserved capacity. Alternatively, the control unit 301 may add a certain capacity to the reserved capacity without considering the data amount of the requested data transmission.

In step S505, the control unit 301 transmits a response (transmission permission response) indicating that the data transmission is permitted to the vehicle 200A. Thereafter, the processing step returns to step S501, and the control unit 301 waits for a subsequent transmission permission request.

When the processing step proceeds from step S503 to step S506, the control unit 301 transmits a response (transmission rejection response) indicating that the data transmission is rejected. The transmission rejection response may include information indicating the allowable data amount (the upper limit of the amount of data that can be transmitted by the vehicle 200A). Thereafter, the processing step returns to step S501, and the control unit 301 waits for a subsequent transmission permission request.

Here, processing after step S405 of the vehicle 200A will be described with reference to FIG. 4 again. In step S405, the control unit 201 of the vehicle 200A receives a response to the transmission permission request transmitted in step S404 from the communication control apparatus 300. The response received here is the response transmitted in step S505 or step S506, that is, the transmission permission response or the transmission rejection response. Further, as described above, the transmission rejection response may include information indicating the allowable data amount.

In step S406, the control unit 201 of the vehicle 200A determines whether data transmission is permitted based on the response received in step S405. When data transmission is permitted, the processing step proceeds to step S407, and otherwise the processing step proceeds to step S408.

In step S407, the control unit 201 transmits data to the vehicle 200B as a routing destination. Thereafter, the processing step returns to step S401, and the control unit 201 waits for generation of subsequent data to be transmitted.

Note that, as can be understood from FIG. 4, when it is determined in step S403 that the data amount is less than a threshold value (less than the second threshold value), the control unit 201 transmits the data in step S407 without transmitting a transmission permission request to the communication control apparatus 300. This is because, when the amount of data to be transmitted is small, it is considered that there is a relatively low possibility that the capacity of the buffer memory 206 becomes insufficient in the vehicle 200B that receives the data.

When the processing step proceeds from step S406 to step S408, the control unit 201 divides original data to be transmitted into data to be transmitted to the vehicle 200B and remaining data to be transmitted based on the allowable data amount indicated by the information included in the transmission rejection response. This division is performed so that the amount of data to be transmitted to the vehicle 200B does not exceed the allowable data amount. Thereafter, the control unit 201 performs the processing after step S402 for each of the data to be transmitted to the vehicle 200B and the remaining data to be transmitted. At that time, the control unit 201 determines the vehicle 200B as the routing destination for the data to be transmitted to the vehicle 200B, and determines another vehicle as the routing destination for the remaining data to be transmitted.

Figure 6:
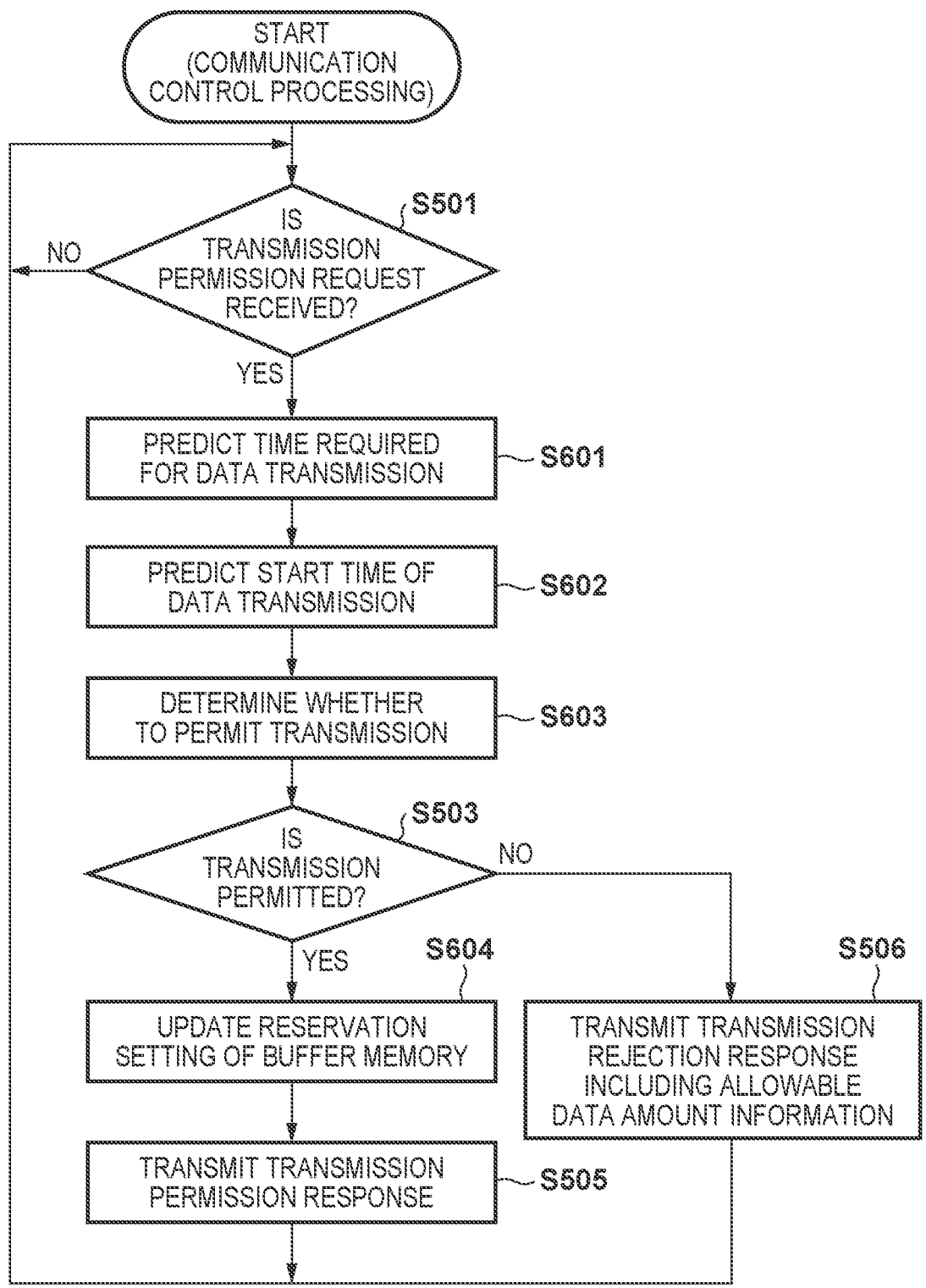
FIG. 6 is a flowchart (modified example) of communication control processing executed by the communication control apparatus 300.

Next, a modified example of the communication control processing executed by the communication control apparatus 300 will be described with reference to FIG. 6. In FIG. 6, steps in which processing identical or similar to those in FIG. 5 are denoted by reference numerals identical to those in FIG. 5. In this modified example, the reservation setting of the buffer memory 206 defines temporal changes in reserved capacity. Therefore, the control unit 301 can know a reserved capacity at a specific time by referring to a reservation setting.

In step S601, the control unit 301 predicts time required for data transmission. A prediction method is not particularly limited, but for example, the control unit 301 can predict the required time according to the following formula (1).

$$\text{SendTime} = \text{DataAmount}/\min(\text{Bitrate}\_Tx, \text{Bitrate}\_Rx) \quad (1)$$

provided that

SendTime: estimated required time [sec]

DataAmount: amount of data to be transmitted [bit]

Bitrate Tx: available bandwidth of the vehicle 200 on a transmission side [bps]

Bitrate Rx: available bandwidth of the vehicle 200 on a receiving side [bps]

In step S602, the control unit 301 predicts start time of data transmission. The reason for making this prediction is that, for example, even if the vehicle 200B is selected as a routing destination of the vehicle 200A, the vehicle 200A and the vehicle 200B are not necessarily in a communicable positional relationship at a time of the selection. A prediction method is not particularly limited, but the control unit 301 can predict, as the start time of data transmission, a time at which the vehicle 200A and the vehicle 200B are in a positional relationship in which direct communication is possible based on, for example, information indicating a scheduled moving route of the vehicle 200A (first route information) and information indicating a scheduled moving route of the vehicle 200B (second route information).

Note that a method by which the control unit 301 acquires the first route information and the second route information is also not particularly limited. For example, a configuration can be adopted in which a server that manages the network 100 acquires and stores route information of each vehicle 200 from each vehicle 200, and the control unit 301 acquires necessary route information from this server.

In step S603, the control unit 301 determines whether to permit data transmission. As a determination method in step S603, as in step S502 in FIG. 5, various determination methods using the free capacity and the reserved capacity (In addition, the data amount of the requested data transmission in some cases) of the buffer memory 206 can be used. However, the determination method in step S603 is different from the determination method in step S502 in that the reserved capacity at the start time predicted in step S602 is used.

In step S604, the control unit 301 updates, as in step S504 of FIG. 5, the reservation setting of the buffer memory 206 of the vehicle 200B such that the capacity for the received data corresponding to the data transmission to be permitted is added to the reserved capacity. However, unlike step S504, the updating in step S604 is performed in consideration of the required time predicted in step S601.

For example, the control unit 301 can update the reservation setting such that the reserved capacity includes the capacity for the received data over the required time. As a result, the buffer memory 206 can be reserved for a time zone in which data transmission from the vehicle 200A to the vehicle 200B is actually performed.

Furthermore, the control unit 301 may update the reservation setting in consideration of the start time predicted in step S602 in addition to the required time predicted in step S601. For example, the control unit 301 can update the reservation setting such that the reserved capacity includes the capacity for the received data over the required time from the start time. The buffer memory 206 can be reserved so as to more accurately cover a time zone in which data transmission from the vehicle 200A to the vehicle 200B is actually performed.

Alternatively, the control unit 301 may determine a completion time of the data transmission based on the start time and the required time, and update the reservation setting such that the reserved capacity includes the capacity for the received data over a time from a current time to the completion time. In this case, the capacity for the received data is also reserved for a time zone before the start time of data transmission (a time zone from the current time to the start time). As a result, before the start of data transmission from the vehicle 200A to the vehicle 200B, another vehicle 200 (for example, the vehicle 200C) transmits data to the vehicle 200B, and it is possible to reduce the possibility that the capacity of the buffer memory 206 becomes insufficient at the start time of data transmission from the vehicle 200A to the vehicle 200B.

As described above, the possibility that the capacity of the buffer memory 206 becomes insufficient can be further reduced by considering the start time of data transmission when determining whether to permit data transmission or considering the required time (or the required time and the start time) of data transmission when updating the reservation setting.

Summary of Embodiments

The foregoing embodiments disclose at least the following communication control apparatus, communication system, communication control method, and storage medium.

[Item 1]
A communication control apparatus comprising a processor configured to:
receive, from a first mobile communication apparatus, a request for permission of data transmission to a second mobile communication apparatus, the second mobile communication apparatus including a buffer memory to store received data;
determine whether to permit the data transmission based on a free capacity of the buffer memory and a reserved capacity indicated by a reservation setting of the buffer memory;
update, when the data transmission is determined to be permitted, the reservation setting such that a capacity for received data corresponding to the data transmission is added to the reserved capacity; and
transmit, when the data transmission is determined to be permitted, a response indicating that the data transmission is permitted to the first mobile communication apparatus.

According to this embodiment, when the requested data transmission is permitted, the capacity for the received data is added to the reserved capacity of the buffer memory. Then, whether to permit the requested data transmission is determined based on the free capacity and the reserved capacity of the buffer memory. Therefore, according to this embodiment, in an environment where a plurality of mobile communication apparatuses may desire to select an identical mobile communication apparatus as a data transmission destination, it is possible to reduce the possibility that the capacity of the buffer memory of the second mobile communication apparatus that receives data becomes insufficient.

[Item 2]
The communication control apparatus according to item 1, wherein
the request for permission of the data transmission includes information indicating data amount of the data transmission, and
the processor determines a size of the capacity for the received data to be added to the reserved capacity based on the data amount of the data transmission.

According to this embodiment, since it is possible to add different capacities to the reserved capacity according to the data amount of the requested data transmission, it is possible to further reduce the possibility that the capacity of the buffer memory of the second mobile communication apparatus that receives the data becomes insufficient.

[Item 3]
The communication control apparatus according to item 2, wherein
the processor determines whether to permit the data transmission based on the free capacity and the reserved capacity of the buffer memory, and the data amount of the data transmission.

According to this embodiment, it is possible to further reduce the possibility that the capacity of the buffer memory of the second mobile communication apparatus that receives data becomes insufficient.

[Item 4]
The communication control apparatus according to item 3, wherein
the processor determines to permit the data transmission when the data amount of the data transmission does not exceed allowable data amount determined based on the free capacity and the reserved capacity of the buffer memory.

According to this embodiment, it is possible to further reduce the possibility that the capacity of the buffer memory of the second mobile communication apparatus that receives data becomes insufficient.

[Item 5]
The communication control apparatus according to item 4, wherein
the allowable data amount is a data amount corresponding to a capacity obtained by subtracting the reserved capacity and a predetermined margin capacity from the free capacity of the buffer memory.

According to this embodiment, it is possible to reduce the possibility that the buffer memory is completely full due to the requested data transmission. This can reduce a possibility that the second mobile communication apparatus cannot receive other important data.

[Item 6]
The communication control apparatus according to item 4, wherein
when the data transmission is determined not to be permitted, the processor transmits a response including information indicating the allowable data amount to the first mobile communication apparatus.

According to this embodiment, the first mobile communication apparatus can know the amount of data that can be transmitted, and for example, can appropriately divide and transmit data.

[Item 7]
The communication control apparatus according to item 2, wherein
when the data amount of the data transmission is less than a first threshold, the processor determines to permit the data transmission regardless of the free capacity and the reserved capacity of the buffer memory.

According to this embodiment, it is possible to reduce a possibility that data transmission is rejected although the possibility that the buffer memory becomes insufficient is relatively low.

[Item 8]
The communication control apparatus according to item 1, wherein the processor is further configured to
predict a required time for the data transmission, wherein
the reservation setting is configured to define temporal changes of the reserved capacity, and
the processor updates the reservation setting such that the reserved capacity includes the capacity for the received data over the required time.

According to this embodiment, the buffer memory can be reserved for a time zone in which data transmission from the first mobile communication apparatus to the second mobile communication apparatus is actually performed.

[Item 9]
The communication control apparatus according to item 8, wherein the processor is further configured to
predict a start time of the data transmission, wherein
the processor updates the reservation setting such that the reserved capacity includes the capacity for the received data over the required time from the start time.

According to this embodiment, it is possible to reserve the buffer memory so as to more accurately cover the time zone in which the data transmission from the first mobile communication apparatus to the second mobile communication apparatus is actually performed.

[Item 10]

The communication control apparatus according to item 8, wherein the processor is further configured to predict a start time of the data transmission, wherein the processor updates the reservation setting such that the reserved capacity includes the capacity for the received data over a time from a current time to a completion time of the data transmission determined based on the start time and the required time.

According to this embodiment, it is possible to reduce the possibility that the capacity of the buffer memory becomes insufficient at the start of data transmission from the first mobile communication apparatus to the second mobile communication apparatus, when another mobile communication apparatus transmits data to the second mobile communication apparatus before the start of data transmission from the first mobile communication apparatus to the second mobile communication apparatus.

[Item 11]

The communication control apparatus according to item 9, wherein the processor is further configured to acquire first route information indicating a scheduled moving route of the first mobile communication apparatus and second route information indicating a scheduled moving route of the second mobile communication apparatus, wherein the processor predicts, as the start time, a time at which the first mobile communication apparatus and the second mobile communication apparatus are in a positional relationship in which direct communication is possible, based on the first route information and the second route information.

According to this embodiment, it is possible to more accurately predict the start time of data transmission.

[Item 12]

The communication control apparatus according to item 9, wherein the processor determines whether to permit the data transmission based on the free capacity of the buffer memory and the reserved capacity at the start time indicated by the reservation setting.

According to this embodiment, it is possible to further reduce the possibility that the capacity of the buffer memory of the second mobile communication apparatus that receives data becomes insufficient.

[Item 13]

The communication control apparatus according to item 1, wherein the communication control apparatus is included in the second mobile communication apparatus.

According to this embodiment, the communication control apparatus and the second mobile communication apparatus can be integrated.

[Item 14]

The communication control apparatus according to item 1, wherein the first mobile communication apparatus and the second mobile communication apparatus are on-board devices.

According to this embodiment, the first mobile communication apparatus and the second mobile communication apparatus can be mounted on a vehicle.

[Item 15]

A communication system comprising:

the communication control apparatus according to item 1; and the first mobile communication apparatus, wherein the first mobile communication apparatus comprises a processor configured to:

determine whether data amount of the data transmission to the second mobile communication apparatus is equal to or larger than a second threshold;

transmit, to the communication control apparatus, the request for permission of the data transmission to the second mobile communication apparatus when the data amount of the data transmission is equal to or larger than the second threshold;

receive the response indicating that the data transmission is permitted in response to the request for permission of the data transmission; and execute the data transmission to the second mobile communication apparatus when the response indicating that the data transmission is permitted is received or the data amount of the data transmission is less than the second threshold.

According to this embodiment, the first mobile communication apparatus can quickly start transmitting relatively small data. In addition, processing loads of the communication control apparatus and the first mobile communication apparatus are reduced.

[Item 16]

A communication control method executed by a communication control apparatus, comprising:

receiving, from a first mobile communication apparatus, a request for permission of data transmission to a second mobile communication apparatus, the second mobile communication apparatus including a buffer memory to store received data;

determining whether to permit the data transmission based on a free capacity of the buffer memory and a reserved capacity indicated by a reservation setting of the buffer memory;

updating, when the data transmission is determined to be permitted, the reservation setting such that a capacity for received data corresponding to the data transmission is added to the reserved capacity; and transmitting, when the data transmission is determined to be permitted, a response indicating that the data transmission is permitted to the first mobile communication apparatus.

According to this embodiment, when the requested data transmission is permitted, the capacity for the received data is added to the reserved capacity of the buffer memory. Then, whether to permit the requested data transmission is determined based on the free capacity and the reserved capacity of the buffer memory. Therefore, according to this embodiment, in an environment where a plurality of mobile communication apparatuses may desire to select an identical mobile communication apparatus as a data transmission destination, it is possible to reduce the possibility that the capacity of the buffer memory of the second mobile communication apparatus that receives data becomes insufficient.

[Item 17]

A non-transitory computer-readable storage medium which stores a program for causing a computer to execute a communication control method comprising:

receiving, from a first mobile communication apparatus, a request for permission of data transmission to a second mobile communication apparatus, the second mobile communication apparatus including a buffer memory to store received data;

determining whether to permit the data transmission based on a free capacity of the buffer memory and a reserved capacity indicated by a reservation setting of the buffer memory;

updating, when the data transmission is determined to be permitted, the reservation setting such that a capacity for received data corresponding to the data transmission is added to the reserved capacity; and transmitting, when the data transmission is determined to be permitted, a response indicating that the data transmission is permitted to the first mobile communication apparatus.

According to this embodiment, when the requested data transmission is permitted, the capacity for the received data is added to the reserved capacity of the buffer memory. Then, whether to permit the requested data transmission is determined based on the free capacity and the reserved capacity of the buffer memory. Therefore, according to this embodiment, in an environment where a plurality of mobile communication apparatuses may desire to select an identical mobile communication apparatus as a data transmission destination, it is possible to reduce the possibility that the capacity of the buffer memory of the second mobile communication apparatus that receives data becomes insufficient.

Note that no particular limitation is intended with regard to the specific configurations of software and hardware for implementing various types of functions that have been described in the foregoing embodiments. Arbitrary software, arbitrary hardware, and an arbitrary combination of arbitrary software and arbitrary hardware are encompassed within the scope of the foregoing embodiments, as long as they are technically possible.

Although the embodiments of the invention have been described above, the invention is not limited to the foregoing embodiments, and various variations/changes are possible within the spirit of the invention.

What is claimed is:

1. A communication control apparatus comprising a processor configured to: receive, from a first mobile communication apparatus, a request for permission of data transmission to a second mobile communication apparatus, the second mobile communication apparatus including a buffer memory to store received data; determine whether to permit the data transmission based on a free capacity of the buffer memory and a reserved capacity indicated by a reservation setting of the buffer memory; update, when the data transmission is determined to be permitted, the reservation setting such that a capacity for received data corresponding to the data transmission is added to the reserved capacity; and transmit, when the data transmission is determined to be permitted, a response indicating that the data transmission is permitted to the first mobile communication apparatus; wherein: the request for permission of the data transmission includes information indicating a data amount of the data transmission; the processor determines a size of the capacity for the received data to be added to the reserved capacity based on the data amount of the data transmission; and when the data amount of the data transmission is less than a first threshold, the processor determines to permit the data transmission regardless of the free capacity and the reserved capacity of the buffer memory.

2. The communication control apparatus according to claim 1, wherein when the data amount of the data transmission is greater than or equal to the first threshold, the processor determines whether to permit the data transmission based on the free capacity and the reserved capacity of the buffer memory, and the data amount of the data transmission.

3. The communication control apparatus according to claim 2, wherein the processor determines to permit the data transmission when the data amount of the data transmission does not exceed an allowable data amount determined based on the free capacity and the reserved capacity of the buffer memory.

4. The communication control apparatus according to claim 3, wherein the allowable data amount is a data amount corresponding to a capacity obtained by subtracting the reserved capacity and a predetermined margin capacity from the free capacity of the buffer memory.

5. The communication control apparatus according to claim 3, wherein when the data transmission is determined not to be permitted, the processor transmits a response including information indicating the allowable data amount to the first mobile communication apparatus.

6. The communication control apparatus according to claim 1, wherein the processor is further configured to predict a required time for the data transmission, wherein the reservation setting is configured to define temporal changes of the reserved capacity, and the processor updates the reservation setting such that the reserved capacity includes the capacity for the received data over the required time.

7. The communication control apparatus according to claim 6, wherein the processor is further configured to predict a start time of the data transmission, wherein the processor updates the reservation setting such that the reserved capacity includes the capacity for the received data over the required time from the start time.

8. The communication control apparatus according to claim 6, wherein the processor is further configured to predict a start time of the data transmission, wherein the processor updates the reservation setting such that the reserved capacity includes the capacity for the received data over a time from a current time to a completion time of the data transmission determined based on the start time and the required time.

9. The communication control apparatus according to claim 7, wherein the processor is further configured to acquire first route information indicating a scheduled moving route of the first mobile communication apparatus and second route information indicating a scheduled moving route of the second mobile communication apparatus, wherein the processor predicts, as the start time, a time at which the first mobile communication apparatus and the second mobile communication apparatus are in a positional relationship in which direct communication is possible, based on the first route information and the second route information.

10. The communication control apparatus according to claim 7, wherein the processor determines whether to permit the data transmission based on the free capacity of the buffer memory and the reserved capacity at the start time indicated by the reservation setting.

11. The communication control apparatus according to claim 1, wherein the communication control apparatus is included in the second mobile communication apparatus.

12. The communication control apparatus according to claim 1, wherein the first mobile communication apparatus and the second mobile communication apparatus are on-board devices.

13. A communication system comprising: the communication control apparatus according to claim 1; and the first mobile communication apparatus, wherein the first mobile communication apparatus comprises a processor configured to: determine whether data amount of the data transmission to the second mobile communication apparatus is equal to or larger than a second threshold; transmit, to the communication control apparatus, the request for permission of the data transmission to the second mobile communication apparatus when the data amount of the data transmission is equal to or larger than the second threshold;

receive the response indicating that the data transmission is permitted in response to the request for permission of the data transmission; and execute the data transmission to the second mobile communication apparatus when the response indicating that the data transmission is permitted is received or the data amount of the data transmission is less than the second threshold.

14. A communication control method executed by a communication control apparatus, comprising:

receiving, from a first mobile communication apparatus, a request for permission of data transmission to a second mobile communication apparatus, the second mobile communication apparatus including a buffer memory to store received data;

determining whether to permit the data transmission based on a free capacity of the buffer memory and a reserved capacity indicated by a reservation setting of the buffer memory;

updating, based on the data transmission being determined to be permitted, the reservation setting such that a capacity for received data corresponding to the data transmission is added to the reserved capacity; and transmitting, based on the data transmission being determined to be permitted, a response indicating that the data transmission is permitted to the first mobile communication apparatus, wherein:

the request for permission of the data transmission includes information indicating a data amount of the data transmission;

a size of the capacity for the received data to be added to the reserved capacity is determined based on the data amount of the data transmission; and based on the data amount of the data transmission being less than a first threshold, the data transmission is determined to be permitted regardless of the free capacity and the reserved capacity of the buffer memory.

15. A non-transitory computer-readable storage medium which stores a program for causing a computer to execute a communication control method comprising:

receiving, from a first mobile communication apparatus, a request for permission of data transmission to a second mobile communication apparatus, the second mobile communication apparatus including a buffer memory to store received data; determining whether to permit the data transmission based on a free capacity of the buffer memory and a reserved capacity indicated by a reservation setting of the buffer memory; updating, when the data transmission is determined to be permitted, the reservation setting such that a capacity for received data corresponding to the data transmission is added to the reserved capacity; and transmitting, when the data transmission is determined to be permitted, a response indicating that the data transmission is permitted to the first mobile communication apparatus, wherein: the request for permission of the data transmission includes information indicating a data amount of the data transmission; a size of the capacity for the received data to be added to the reserved capacity is determined based on the data amount of the data transmission; and when the data amount of the data transmission is less than a first threshold, the data transmission is determined to be permitted regardless of the free capacity and the reserved capacity of the buffer memory.

* * * * *